United States Patent
Oishi et al.

(10) Patent No.: US 11,504,700 B2
(45) Date of Patent: Nov. 22, 2022

(54) EXHAUST GAS PURIFICATION CATALYST

(71) Applicant: CATALER CORPORATION, Kakegawa (JP)

(72) Inventors: Shunsuke Oishi, Kakegawa (JP); Shogo Kawamura, Kakegawa (JP); Takahiro Nagata, Kakegawa (JP); Hirotaka Ori, Kakegawa (JP); Minoru Itou, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 328 days.

(21) Appl. No.: 16/603,380

(22) PCT Filed: Apr. 9, 2018

(86) PCT No.: PCT/JP2018/014939
§ 371 (c)(1),
(2) Date: Oct. 7, 2019

(87) PCT Pub. No.: WO2018/190300
PCT Pub. Date: Oct. 18, 2018

(65) Prior Publication Data
US 2020/0030780 A1    Jan. 30, 2020

(30) Foreign Application Priority Data
Apr. 11, 2017    (JP) .............................. JP2017-078366

(51) Int. Cl.
*B01J 21/04*    (2006.01)
*B01J 21/06*    (2006.01)
(Continued)

(52) U.S. Cl.
CPC .......... *B01J 27/053* (2013.01); *B01D 53/944* (2013.01); *B01D 53/9413* (2013.01);
(Continued)

(58) Field of Classification Search
CPC .......... B01J 21/04; B01J 21/06; B01J 21/063; B01J 21/066; B01J 21/08; B01J 21/10;
(Continued)

(56) References Cited

U.S. PATENT DOCUMENTS 3,932,309 A    1/1976  Graham et al.
6,413,904 B1   7/2002  Strehlau et al.
(Continued)

FOREIGN PATENT DOCUMENTS

CN    104741135    7/2015
JP    5237390      9/1993
(Continued)

OTHER PUBLICATIONS

European Office Action dated Jan. 15, 2021 in EP Application No. 18783833.9.
(Continued)

*Primary Examiner* — Cam N. Nguyen
(74) *Attorney, Agent, or Firm* — Occhiuti & Rohlicek LLP

(57) ABSTRACT

The present invention provides an exhaust gas purification catalyst including an alkaline earth metal supported in a highly dispersed state on a porous carrier. A catalyst layer of the exhaust gas purification catalyst provided by the invention has an alkaline earth metal-supporting region including a porous carrier, a catalyst metal belonging to the platinum group, and a sulfate of at least one type of alkali earth metal supported on the porous carrier. In a cross-section of this region, a Pearson correlation coefficient $R_{Ae/M}$ is at least 0.5 as calculated using α and β for each pixel obtained by carrying out area analysis by FE-EPMA under conditions of pixel size of 0.34 μm×0.34 μm, and measured pixel number 256×256, and by measuring the characteristic X-ray intensity (α:cps) of the alkaline earth metal element (Ae) and the (Continued)

characteristic X-ray intensity (β:cps) of the main constituent element of the inorganic compound constituting the porous carrier for each pixel.

3 Claims, 4 Drawing Sheets

(51) Int. Cl.

| | |
|---|---|
| *B01J 21/08* | (2006.01) |
| *B01J 21/10* | (2006.01) |
| *B01J 21/12* | (2006.01) |
| *B01J 23/02* | (2006.01) |
| *B01J 23/42* | (2006.01) |
| *B01J 23/44* | (2006.01) |
| *B01J 23/46* | (2006.01) |
| *B01J 23/58* | (2006.01) |
| *B01J 35/00* | (2006.01) |
| *B01J 35/04* | (2006.01) |
| *B01J 37/02* | (2006.01) |
| *B01J 37/08* | (2006.01) |
| *B01J 27/053* | (2006.01) |
| *B01D 53/94* | (2006.01) |
| *F01N 3/28* | (2006.01) |

(52) U.S. Cl.
CPC ........ *B01D 53/9468* (2013.01); *B01J 23/464* (2013.01); *B01J 35/0006* (2013.01); *B01J 35/04* (2013.01); *B01J 37/0228* (2013.01); *B01J 37/0236* (2013.01); *B01J 37/086* (2013.01); *F01N 3/2839* (2013.01); *B01D 2255/1023* (2013.01); *B01D 2255/1025* (2013.01); *B01D 2255/2042* (2013.01); *B01D 2255/908* (2013.01); *B01D 2255/9022* (2013.01)

(58) Field of Classification Search
CPC ............ B01J 21/12; B01J 23/02; B01J 23/42; B01J 23/44; B01J 23/464; B01J 23/58; B01J 35/0006; B01J 35/04; B01J 37/0228; B01J 37/0236; B01J 37/086; B01J 27/053; B01D 53/9413; B01D 53/944; B01D 53/9468; F01N 3/2839
USPC ........ 502/258–262, 328, 332–334, 339, 349, 502/355, 415, 439, 527.12, 527.13, 502/527.19
See application file for complete search history.

(56) References Cited

U.S. PATENT DOCUMENTS

| | | | | |
|---|---|---|---|---|
| 7,491,674 | B2* | 2/2009 | Fujii | B01D 53/885 |
| | | | | 502/178 |
| 8,318,632 | B2* | 11/2012 | Matsueda | B01J 23/58 |
| | | | | 502/328 |
| 8,546,296 | B2* | 10/2013 | Yabuzaki | B01J 37/0244 |
| | | | | 502/332 |
| 8,569,198 | B2* | 10/2013 | Hoshino | B01J 23/58 |
| | | | | 502/217 |
| 8,580,706 | B2* | 11/2013 | Matsueda | B01D 53/945 |
| | | | | 502/328 |
| 8,741,799 | B2* | 6/2014 | Matsueda | B01J 23/58 |
| | | | | 502/170 |
| 9,364,973 | B2* | 6/2016 | VonDross | E04C 1/00 |
| 9,789,469 | B2* | 10/2017 | Matsueda | B01J 35/023 |
| 2005/0014638 | A1 | 1/2005 | Miura | |
| 2008/0314291 | A1 | 12/2008 | Grothe et al. | |
| 2011/0047975 | A1 | 3/2011 | Nakayama et al. | |
| 2011/0245076 | A1 | 10/2011 | Matsueda et al. | |
| 2012/0065058 | A1 | 3/2012 | Matsueda et al. | |
| 2012/0071318 | A1 | 3/2012 | Matsueda et al. | |
| 2012/0088655 | A1 | 4/2012 | Yabuzaki et al. | |
| 2012/0149557 | A1 | 6/2012 | Hoshino et al. | |
| 2012/0165185 | A1 | 6/2012 | Gramiccioni et al. | |
| 2014/0065043 | A1 | 3/2014 | Kato et al. | |
| 2015/0045209 | A1 | 2/2015 | Fujimura et al. | |
| 2019/0083931 | A1* | 3/2019 | Yanagawa | B01J 35/002 |

FOREIGN PATENT DOCUMENTS

| | | |
|---|---|---|
| JP | 11285639 | 10/1999 |
| JP | 2000-117110 | 4/2000 |
| JP | 2001-232208 | 8/2001 |
| JP | 2004-223403 | 8/2004 |
| JP | 2010-022918 | 2/2010 |
| JP | 2014/505587 | 3/2014 |
| JP | 5558199 | 7/2014 |
| JP | 2015-142914 | 8/2015 |
| WO | 2010/137658 | 12/2010 |
| WO | 2010/147163 | 12/2010 |
| WO | 2011/030831 | 3/2011 |
| WO | 2012/128297 | 9/2012 |
| WO | 2013/065421 | 5/2013 |
| WO | 2014/156746 | 10/2014 |
| WO | 2015083590 A1 | 6/2015 |

OTHER PUBLICATIONS

European Search Report dated Nov. 14, 2019 in EP Application No. 18783833.9.
Office Action in CN201880024001.6, dated Dec. 23, 2021 (8 Pages).
Office Action in JP2019-512500, dated Jan. 6, 2022 (5 Pages).
Chinese Office Action, dated Jun. 28, 2022 (5 pages).

* cited by examiner

EXHAUST GAS PURIFICATION CATALYST

CROSS REFERENCE TO RELATED APPLICATIONS

This application is the national phase under 35 USC 371 of PCT/JP2018/014939, filed Apr. 9, 2018, which claims the benefit of Japanese patent application no. 2017-078366 filed on Apr. 11, 2017.

TECHNICAL FIELD

The present invention relates to an exhaust gas purification catalyst for installation in the exhaust systems of internal combustion engines. Specifically, it relates to an exhaust gas purification catalyst containing at least one metal belonging to the platinum-group as a catalyst metal, and also having an alkaline earth metal such as barium (Ba) or strontium (Sr) as a co-catalyst component.

BACKGROUND ART

So-called three-way catalysts are used as exhaust gas purification catalysts for removing harmful components such as hydrocarbons (HC), carbon monoxide (CO) and nitrogen oxides ($NO_x$) by oxidation or reduction reactions from the exhaust gas emitted by internal combustion engines such as automobile engines. Catalysts including metals that function as oxidation and/or reduction catalysts (typically, precious metals such as palladium (Pd) and rhodium (Rh) belonging to the platinum group; hereinafter may be referred to as "catalyst metals"), supported on porous carriers consisting of inorganic oxides such as alumina ($Al_2O_3$), zirconia ($ZrO_2$) and the like are used as three-way catalysts. For example, three-way catalysts including Pd as an oxidation catalyst and Rh as a reduction catalyst supported on a porous carrier are widely used.

Co-catalyst components that can improve the exhaust gas purification functions are also used in this type of exhaust gas purification catalyst. Examples thereof include alkaline earth metals such as barium (Ba) and strontium (Sr). For example, by including an alkaline earth metal component such as Ba in at least some regions of the catalyst layer at a suitable amount (for example, about 1 mass % to 10 mass % of all of the regions), it is possible to temporarily occlude the $NO_x$ contained in exhaust gas, while when Pd is also included, sintering of the Pd is suppressed by electron donation from Ba to Pd, and the catalytic activity of Pd can be maintained or improved. For example, Patent Literature 1 and 2 below described conventional exhaust gas purification catalysts containing alkaline earth metals such as Ba and Sr as co-catalysts.

CITATION LIST

Patent Literature

Patent Literature 1: Japanese Patent Application Publication No. H05-237390

Patent Literature 2: Japanese Patent Application Publication No. H11-285639

SUMMARY OF INVENTION

Technical Problem

However, in order to obtain the co-catalytic effects of the alkaline earth metals as described above, the alkaline earth metal must be near the catalyst metal in the catalyst layer of the exhaust gas purification catalyst. Moreover, in order to obtain the effects of the co-catalyst throughout the exhaust gas purification catalyst, it is also important that the alkaline earth catalyst be in a highly dispersed state together with the catalyst metal.

However, with conventional catalyst layer-forming methods, the alkaline earth metal component becomes unevenly distributed in the catalyst layer (alkaline earth metal-supporting region), and it has not been possible to support it on the outer surface and within the pores of the porous carrier in a highly dispersed state. In other words, it has not been possible to support (fix) an alkaline earth metal near a catalyst metal that is supported in a highly dispersed state on the outer surface and in the pores of a porous carrier in a catalyst layer (alkaline earth metal-supporting region), with the alkaline earth metal being similarly in a highly dispersed state. For example, more than half of the alkaline earth metal may be disproportionately located on the outer surface of the porous carrier, which is disadvantageous.

It is therefore an object of the present invention, which was devised in order to solve the existing problem, to provide an exhaust gas purification catalyst including an alkaline earth metal as a co-catalyst component supported in a highly dispersed state on a porous carrier, and manufacturing method whereby such highly-dispersed support can be achieved.

Solution to Problem

The inventors conducted a detailed investigation of the existence states of alkaline earth metals such as Ba as co-catalysts in catalyst layers. It was then confirmed that when an alkaline earth metal such as Ba is used in the form of a water-insoluble sulfate from the raw material stage, the alkaline earth metal is disproportionately located in the catalyst layer, and a highly dispersed state cannot be achieved. Moreover, in the case where sulfate (insoluble salt) of the alkaline earth metal such as Ba is formed by using a raw material slurry containing a water-soluble compound such as a nitrate salt of Ba, and supplying sulfuric acid or an ammonium sulfate solution to this slurry, the raw material slurry becomes too acidic in the subsequent drying and firing steps. Therefore, the alkaline earth metal cannot maintain a highly dispersed state and is disproportionately located, with the result that a highly dispersed state has also not been achieved.

Therefore, the inventors investigated the alkaline earth metals such as Ba from the raw material stage thereof, and completed the present invention after discovering that by using raw materials including a water-soluble compound of an alkaline earth metal together with a certain type of S-containing water-soluble organic compound, it was possible to dispose (support) an alkaline earth metal sulfate of Ba or the like on a porous carrier in a highly dispersed state together with a catalyst metal in a catalyst layer (alkaline earth metal-supporting region).

The present invention provides an exhaust gas purification catalyst that purifies exhaust gas emitted by an internal combustion engine when disposed in the exhaust pipe of the internal combustion engine.

That is, the exhaust gas purification catalyst disclosed here includes a substrate and a catalyst layer formed on the substrate. The catalyst layer has an alkaline earth metal-supporting region includes a porous carrier composed of an inorganic compound, at least one catalyst metal belonging to the platinum group that is supported on the porous carrier and functions as an oxidation and/or reduction catalyst, and at least one sulfate of alkaline earth metal supported on the porous carrier.

Moreover, when a cross-section of the alkaline earth metal-supporting region of the catalyst layer in the exhaust gas purification catalyst disclosed here is subjected to area analysis by FE-EPMA under conditions of pixel (section) size of 0.34 μm×0.34 μm and number of measured pixels (sections) of 256×256, and a characteristic X-ray intensity (α:cps) of the alkaline earth metal element (Ae) and a characteristic X-ray intensity (β:cps) of the main constituent element of the inorganic compound constituting the porous carrier (M:that is, the main constituent metal element or semi-metal element confirming the inorganic compound) are measured for each pixel, and when the Pearson correlation coefficient calculated using the resulting α and β for each pixel is designated as $R_{Ae/M}$, the value of $R_{Ae/M}$ is at least 0.5.

The exhaust gas purification catalyst disclosed here is a catalyst product that can be manufactured by the method for manufacturing the exhaust gas purification catalyst (explained in detail below) provided by the present invention, and as discussed above, is characterized by having a value of at least 0.5 of $R_{Ae/M}$, which is the Pearson correlation coefficient (product moment correlation coefficient) calculated based on the results of area analysis by FE-EPMA.

The correlation coefficient $R_{Ae/M}$ is determined by the formula:

$$R_{Ae/M} = (\text{covariance})/(\text{standard deviation of } \alpha \times \text{standard deviation of } \beta)$$

wherein the first variable (α) is a characteristic X-ray intensity of the alkaline earth metal element (Ae) and the second variable (β) is a characteristics X-ray intensity of the main constituent element (M) of the inorganic compound constituting the porous carrier in area analysis by FE-EPMA.

In a characterized feature of the exhaust gas purification catalyst of this configuration, the locations (distribution) of the main constituent element of the porous carrier and the locations (distribution) of the alkaline earth metal element are highly correlated in the alkaline earth metal-supporting region of the catalyst layer, or in other words the alkaline earth metal (sulfate) is present in a highly dispersed state throughout the particles of the porous carrier (that is, on both the outer surface and interior (within the pores) of the carrier particles). Thus, because the alkaline earth metal can be present at a high rate near the catalyst metal particles in the alkaline earth metal-supporting region of the catalyst layer, the effects of the alkaline earth metal as a co-catalyst component can be exerted at a high level.

Consequently, the $NO_x$ contained in exhaust gas can be occluded temporarily by an alkaline earth metal component such as Ba for example, and then effectively reduced and purified by a catalyst metal such as Rh. Furthermore, because the alkaline earth metal can be disposed at a high rate near Pd or the like, it can suppress sintering of the Pd or other catalyst metal, thereby maintaining and improving the catalytic activity.

It is especially desirable that the average particle diameter of the alkaline earth metal sulfate supported on the porous carrier as measured by an X-ray diffraction method be not more than 25 nm. An alkaline earth metal component with such a fine average particle diameter can provide especially good performance as a co-catalyst component.

In another preferred embodiment of the exhaust gas purification catalyst disclosed here, the value of the Pearson correlation coefficient $R_{Ae/M}$ calculated above is at least 0.7.

As shown by the fact that $R_{Ae/M}$ is at least 0.7, an exhaust gas purification catalyst of this configuration has high dispersibility of the alkaline earth metal component. As a result, its performance (functions) as a co-catalyst component can be exerted at a high level in the catalyst layer (alkaline earth metal-supporting region).

When Ae above is Ba and M is Al or Zr, an especially high $R_{Ae/M}$ (which may be called $R_{Ba/Al}$ or $R_{Ba/Zr}$ in this case) can be achieved.

A preferred embodiment of the exhaust gas purification catalyst disclosed here has at least palladium (Pd) and/or rhodium (Rh) as a catalyst metal, and also has at least barium sulfate ($BaSO_4$) as an alkaline earth metal sulfate.

With an exhaust gas purification catalyst of this configuration, $NO_x$ can be stably and temporarily occluded by the highly dispersed barium component (barium sulfate), and the $NO_x$ component temporarily occluded by this component can then be effectively reduced and purified by Rh. The $NO_x$ reduction effect can also be improved due to the highly dispersed state of the components on the carrier. Consequently, an exhaust gas purification catalyst of this configuration can be suitably adopted as a high-performance $NO_x$ purification catalyst.

By including Pd and Ba together, moreover, it is possible to suppress sintering of Pd through the electronic action of Ba, and maintain the activity of Pd. Consequently, an exhaust gas purification catalyst of this configuration can be suitably adopted as a highly durable high-performance exhaust gas purification catalyst.

To achieve the object above, the present invention also provides a method whereby the exhaust gas purification catalyst disclosed here can be suitably manufactured.

The method disclosed here is a method for manufacturing an exhaust gas purification catalyst that is disposed in the exhaust pipe of an internal combustion engine to purify exhaust gas emitted by the internal combustion engine, including a step of forming, on a substrate, a catalyst layer including an alkaline earth metal-supporting region in at least a part of the catalyst layer, the alkaline earth metal-supporting region including a porous carrier composed of an inorganic compound, at least one catalyst metal belonging to the platinum group that is supported on the porous carrier and functions as an oxidation and/or reduction catalyst, and at least one sulfate of alkaline earth metal supported on the porous carrier, and a step of firing the substrate with the catalyst layer formed thereon.

The catalyst layer forming step of the manufacturing method disclosed here includes:

(1) mixing the following components:

an inorganic compound particle for constituting the porous carrier, the catalyst metal particle, or a precursor for depositing the catalyst metal, a water-soluble compound of the alkaline earth metal, and an S-containing water-soluble organic compound that contains S as a constituent element and is capable of producing a sulfate of the alkaline earth metal with an aqueous solvent to prepare a raw material suspension;

(2) drying and firing the raw material suspension to prepare a powder material including a mixture of the porous carrier, the catalyst metal, and a sulfate of the alkaline earth metal;

(3) preparing an alkaline earth metal-supporting region-forming slurry containing at least this powder material and an aqueous solvent; and (4) using this slurry to form the alkaline earth metal-supporting region on the substrate.

In a method for manufacturing an exhaust gas purification catalyst of this configuration, a raw material (suspension) obtained by mixing a water-soluble compound of the alkaline earth metal and an S-containing water-soluble organic compound as defined above together with a carrier component (inorganic compound particle) and a catalyst metal component (catalyst metal particle or precursor compound of catalyst metal) is used for the purpose of forming an alkaline earth metal-supporting region.

In the prepared raw material suspension, the alkaline earth metal water-soluble compound and the S-containing water-soluble organic compound are both dissolved in an aqueous solvent. In this case, the S-containing water-soluble organic compound does not rapidly reduce the pH of the raw material suspension (that is, acidify the suspension), and the alkaline earth metal water-soluble compound and S-containing water-soluble organic compound can diffuse into the interior (inside the pores) of the inorganic compound particles (secondary particles) of the carrier component while maintaining their water-solubility.

The prepared raw material suspension is then dried and fired. In this process, the alkaline earth metal water-soluble compound and the S-containing water-soluble organic compound contained in the suspension react with one another, and an insoluble sulfate of the alkaline earth metal is formed within and outside the inorganic compound particles, and is fixed in these locations.

Consequently, with a manufacturing method of this configuration, it is possible to suitably manufacture an exhaust gas purification catalyst wherein all or part of the catalyst layer is composed of an alkaline earth metal-supporting region characterized in that an alkaline earth metal is present in a highly dispersed state throughout the porous carrier particles (that is, both on the outer surface and inside (inside the pores) of the carrier particles).

In a preferred embodiment of the method for manufacturing the exhaust gas purification catalyst disclosed here, a water-soluble organic compound having at least one functional group selected from a sulfo group (—$SO_3H$), a sulfonyl group (—S(=O)$_2$—), and a sulfinyl group (—S(=O)—) is used as the S-containing water-soluble organic compound.

Such an organic compound having a functional group containing S is preferred as the S-containing water-soluble organic compound for preparing the raw material suspension.

In another preferred embodiment of the method for manufacturing the exhaust gas purification catalyst disclosed here, a hydroxide, acetate or nitrate of any alkaline earth metal selected from Ba, Sr and Ca is used as the water-soluble compound of the alkaline earth metal.

Such a hydroxide, acetate or nitrate has good water-solubility and is desirable as a water-soluble compound of an alkaline earth metal for preparing the raw material suspension.

DESCRIPTION OF EMBODIMENTS

Figure 1:
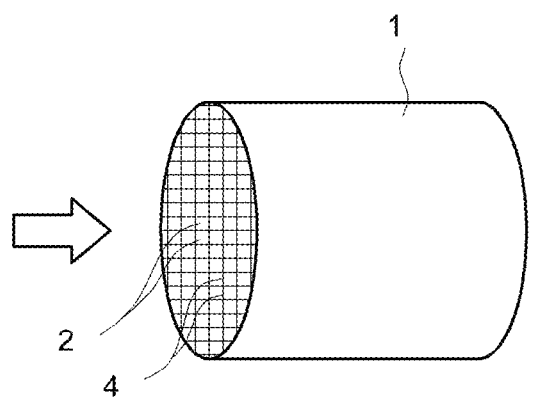
FIG. 1 is a perspective view schematically illustrating the exhaust gas purification catalyst of one embodiment.
Figure 2:
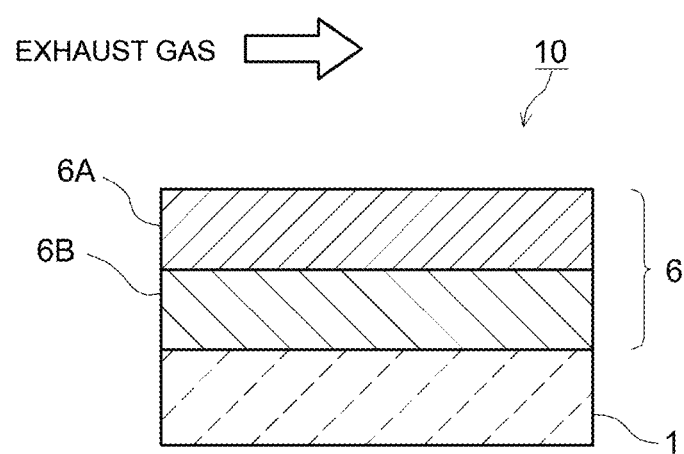
FIG. 2 is a cross-sectional view schematically illustrating a catalyst layer of an exhaust gas purification catalyst of one embodiment.

Some preferred embodiments of the present invention are explained below with reference to the drawings. Matters that is not specifically mentioned in this Description but are necessary for implementing the invention may be understood as design matters by a person skilled in the art based on prior art in the field. The present invention can be implemented based on the content disclosed in this Description and on technical common knowledge in the field. FIGS. 1 and 2 below illustrate the content of the invention so that it can be understood, and the dimensional relationships in the drawings (length, width, thickness, etc.) do not reflect actual dimensional relationships.

The exhaust gas purification catalyst disclosed here is characterized by having a sulfate of an alkaline earth metal with the properties discussed above, provided in a highly dispersed state in at least part of the catalyst layer (that is, in a pre-designed alkaline earth metal-supporting region in the catalyst layer), and other configurations thereof are not particularly limited. The types of the catalyst metal, carrier and substrate can be selected appropriately as discussed below in the exhaust gas purification catalyst, which can then be molded into the desired shape for the application and installed in a variety of internal combustion engines, and particularly the exhaust system (exhaust pipe) of an automobile engine.

In the explanations below, the exhaust gas purification catalyst of the invention is explained mainly in the context of application to a three-way catalyst for the exhaust pipe of an automobile gasoline engine, but not with the intent of limiting the exhaust gas purification catalyst of the invention to this application.

Substrate

The substrate forming the framework of the exhaust gas purification catalyst disclosed here may be in various forms and made of various materials conventionally used in these types of applications. For example, highly heat resistant ceramics such as cordierite and silicon carbide (SiC) are suitable. Alternatively, an alloy (stainless steel, etc.) substrate may be used. The shape may be similar to those of conventional exhaust gas purification catalysts. In one example, as in the exhaust gas purification catalyst 10 shown in FIG. 1, a honeycomb substrate 1 with a cylindrical external shape is provided with through holes (cells) 2 as exhaust gas flow channels in the direction of the cylinder axis, allowing the exhaust gas to contact the dividing walls (rib walls) 4 partitioning the cells 2. The shape of the substrate 1 may also be a foam shape or pellet shape besides a honeycomb shape. It may also be a so-called wall-through substrate (also called a wall flow substrate) in which the exhaust gas flows from an inlet cell on one side, flows through the cell walls and flows into an outlet cell on the other side. Moreover, the external shape of the substrate as a whole may be an oval cylinder or polygonal cylinder instead of a round cylinder.

Catalyst Metal

At least one catalyst metal belonging to the platinum group (hereunder sometimes referred to as a "PGM") and capable of functioning as an oxidation catalyst and/or reduction catalyst is used as the catalyst metal provided in the catalyst layer of the exhaust gas purification catalyst disclosed here. Typical examples include rhodium (Rh), palladium (Pd) and platinum (Pt). Ruthenium (Ru), osmium (Os), iridium (Ir) or another non-PGM metal having a catalyst function may also be used. An alloy of two or more PGMs may also be used. Of these, a combination of highly reductive Rh and highly oxidative Pd or Pt is especially desirably for constructing a three-way catalyst.

This catalyst metal is preferably used in the form of fine particles with a sufficiently small particle size in order to increase the contact area with the exhaust gas. Typically, the average particle diameter (for example, the average value of the particle diameter according to TEM observation, or preferably the average value based on an X-ray diffraction method) is about 1 nm to 15 nm, or preferably not more than 10 nm, or not more than 7 nm, or most preferably not more than 5 nm.

The carrying rate of the catalyst metal (PGM content ratio given 100 mass % as the amount of the carrier) is not particularly limited, but may be not more than 2 mass %, suitably 0.05 mass % to 2 mass % for example, or preferably about 0.2 mass % to 1 mass %. If the carrying rate is too below this range, it is difficult to obtain the catalytic effects of the catalyst metal, while a carrying rate too above this range is disadvantageous from a cost standpoint.

Carrier

An inorganic compound similar to those used in conventional exhaust gas purification catalysts may be used as the porous carrier for constituting the catalyst layer and supporting the catalyst metal described above and other components (for example, the alkaline earth metal).

A porous carrier with a relatively large specific surface area (here and below, the specific surface area measured by the BET method) can be used by preference. Desirable examples include alumina ($Al_2O_3$), zirconia ($ZrO_2$), ceria ($CeO_2$), silica ($SiO_2$), titania ($TiO_2$) and solid solutions of these (for example, ceria-zirconia composite oxide (CZ composite oxide)), or combinations of these. As discussed above, the "main constituent element (M) of the inorganic compound constituting the porous carrier" in this Description is the main constituent metal element or semi-metal element confirming the inorganic compound. Consequently, for example a person skilled in the art can easily understand that the main constituent elements (M) of the alumina, zirconia, ceria, silica, titania and CZ composite oxide listed above are Al, Zr, Ce, Si, Ti and Ce+Zr, respectively.

From the standpoint of increasing the heat stability of the exhaust gas purification catalyst, a highly heat-resistant inorganic compound such as alumina or zirconia is preferably included in the catalyst layer as a carrier or non-carrier (here and below, a constituent of the catalyst layer that does not support the catalyst metal or alkaline earth metal).

From the standpoint of heat resistance and structural stability, the particles of the carrier or non-carrier (for example, an alumina powder or CZ composite oxide powder) preferably have a specific surface area of 50 to 500 $m^2/g$ (for example, 200 to 400 $m^2/g$). The average particle diameter of the carrier particle based on TEM observation is preferably about 1 nm to 500 nm (more preferably 5 nm to 300 nm).

When using such an inorganic compound (ceramic) as a carrier, moreover, the catalyst metal content is suitably about 0.1 to 5 g/L, or preferably about 0.2 to 2 g/L per liter of catalyst volume. A too-large catalyst metal content is undesirable for reasons of cost, while a too-small content is undesirable because exhaust gas purification ability is reduced. In this Description, a catalyst volume of 1 L means that the bulk volume including the pure volume of the substrate and the volume of the internal spaces (cells) (that is, including the catalyst layer formed inside the spaces (cells)) is 1 L.

Catalyst Layer and Alkaline Earth Metal-Supporting Region

As a place for purifying exhaust gas, the catalyst layer formed on the substrate makes up the main body of the exhaust gas purification catalyst, and as discussed above, at least part (or all) of the catalyst layer in the exhaust gas purification catalyst disclosed here is composed of an alkaline earth metal-supporting region.

"Alkaline earth metal-supporting region" in this Description refers to all or a part of the catalyst layer that is provided with a porous carrier, a catalyst metal, and an alkaline earth metal sulfate (barium sulfate, strontium sulfate or the like). "A part of the catalyst layer" refers to a section capable of functioning as an exhaust gas purification catalyst, and does not mean a microscopic part consisting of a few or tens of carrier particles for example that cannot be called a section in the functional sense. As one example, as in the catalyst layer 6 shown in FIG. 2, in the case of the catalyst layer 6 of a laminated structure type made up of an upper and lower layer having different contents formed on the substrate 1, either or both of the lower layer 6B adjacent to the substrate 1 and the upper layer 6A forming the surface part of the catalyst layer 6 may be formed as an alkaline earth metal-supporting region. Alternatively, in a catalyst layer having a monolayer structure or a laminated structure such as that shown in the drawing, a part of an upstream part (or a downstream part) in the direction of flow of the exhaust gas (for example, at least 10 vol % of the total) may constitute the alkaline earth metal-supporting region.

Examples of suitable alkaline earth metal elements constituting the sulfate contained in the alkaline earth metal-supporting region include barium (Ba), strontium (Sr) and calcium (Ca). Ba and Sr are desirable for obtaining a high function as a co-catalyst, and Ba is especially desirable. Barium sulfate ($BaSO_4$) is a stable compound having an extremely high melting point, and because it also has extremely low solubility in water, it is suitable as an alkaline earth metal for supporting on the carrier.

As in the case of the alkaline earth metal-supporting region, the type, location (distribution) and the like of the catalyst metal supported on the catalyst layer can be set appropriately according to the objective. For example, in the catalyst layer 6 with a laminated structure in FIG. 2, the types of carriers and the types and content ratios of the catalyst metals supported on the carriers may be different in the upper layer 6A and lower layer 6B, as in a conventional product. For example, if the lower layer 6B is an alkaline earth metal-supporting region, an alkaline earth metal component (for example, barium sulfate) and at least one type of catalyst metal out of the PGM (for example, Pd or Pt) are included together. It is thus possible to improve the durability of the Pd or the like with respect to sintering.

Rh may also be included as a catalyst metal in the upper layer 6A, which is not an alkaline earth metal-supporting region. It is thus possible to prevent the Rh from being adjacent to the Ba or other alkaline earth metal (especially Ba), and thus prevent excessive oxidation of Rh or a drop in the $NO_x$ purification function of Rh.

In addition to the catalyst metal and alkaline earth metal, various auxiliary components may also be disposed in the catalyst layer. Typically examples include oxygen storage components (OSCs). Suitable examples of OSC materials include zirconium oxide (zirconia), cerium oxide (ceria), zeolite and the like. From the standpoint of the high heat resistance and storage and release speed, it is desirable to use the ceria-zirconia composite oxide (CZ composite oxide) mentioned above as an OSC material.

The dispersibility of the alkaline earth metal in the alkaline earth metal-supporting region of the exhaust gas purification catalyst disclosed here can be easily assessed by determining the Pearson correlation coefficient ($R_{Ae/M}$) discussed above. This correlation coefficient can be calculated by performing FE-EPMA area analysis, measuring a characteristic X-ray intensity ($\alpha$:cps) of the alkaline earth metal element (Ae) and a characteristic X-ray intensity ($\beta$:cps) of the main constituent element (M) of the inorganic compound constituting the porous carrier for each pixel, and using the resulting $\alpha$ and $\beta$ in each pixel to calculate $R_{Ae/M}$.

FE-EPMA (Field Emission Electron Probe Micro-analysis) is an analysis method which is called as a Field Emission Electron Probe Microanalyzer and is capable of performing element analysis and mapping with high accuracy in specific regions of a sample. Using this FE-EPMA, it is possible to measure $\alpha$ and $\beta$ above in a specific number of pixels in the catalyst layer (alkaline earth metal-supporting region) of an exhaust gas purification catalyst, and then use the resulting data to calculate $R_{Ae/M}$.

That is, the Pearson correlation coefficient (product moment correlation coefficient) $R_{Ae/M}$ is determined as $R_{Ae/M}$=(covariance)/(standard deviation of $\alpha$×standard deviation of $\beta$), and specifically is determined by the following formula (1).

[Math. 1]

$$R_{Ae/M} = \frac{\sum (\alpha - \overline{\alpha})(\beta - \overline{\beta})}{\sqrt{\sum (\alpha - \overline{\alpha})^2 \sum (\beta - \overline{\beta})^2}} \quad (1)$$

Calculation of the correlation coefficient $R_{Ae/M}$ based on this formula (1) can be performed using general commercial spreadsheet software, without any particularly difficult manual calculation operations. For example it can be easily derived by making use of the CORREL coefficient function of Microsoft Excel™.

In terms of data collection for purposes of calculating the correlation coefficient, FE-EPMA area analysis can be performed by operations conforming to the manual of a commercial unit.

In general terms, using either the powder material or the excised catalyst layer (alkaline earth metal-supporting region) of an exhaust gas purification catalyst for area analysis, these are embedded in a curable resin material such as epoxy resin to prepare an embedded sample for area analysis. After the resin is cured, the surface to be analyzed is polished, and a conductive material (typically carbon) is deposited thereon to obtain a sample for EPMA analysis. Area analysis is then performed using a commercial unit (for example, an electron beam micro-analyzer such as model JXA-8530F manufactured by JEOL Ltd.).

The pixel (section) size here can be 0.34 μm×0.34 μm, and the number of measured pixels (sections) can be at least 200×200, such as 256×256 for example. The measurement conditions depend on the analysis unit and are not particularly limited, but some typical analysis conditions include the following:

Acceleration voltage: 10 kV to 30 kV (for example, 20 kV)
Irradiation current: 50 nA to 500 nA (for example, 100 nA)
Minimum probe diameter: Not more than 500 nm (for example, 100 nm)
Unit measurement time: 40 ms to 100 ms (for example, 50 ms).

The results of FE-EPMA area analysis can also be displayed as element mapping using the application (computer software) attached to the commercial unit (see drawings below).

The exhaust gas purification catalyst of this embodiment includes a step of forming, on a substrate, a catalyst layer including an alkaline earth metal-supporting region in at least a part of the catalyst layer, the alkaline earth metal-supporting region provided with a porous carrier, at least one type of catalyst metal selected from the PGMs, and at least one type of sulfate of alkaline earth metal supported on the porous carrier, and a step of firing the substrate with the catalyst layer formed thereon.

In the catalyst layer forming step of this process, an inorganic compound particle as a material for constituting the porous carrier, a catalyst metal (PGM) particle as a catalyst metal material or a precursor (for example, a water-soluble salt of the catalyst metal) for depositing this metal, a water-soluble compound of an alkaline earth metal, and an S-containing water-soluble organic compound are first mixed in an aqueous medium to prepare a raw material suspension.

Of the materials used, examples of the water-soluble compound of the alkaline earth metal include various types of salts such as hydroxides, acetates, nitrates, nitrites and the like of Ba, Sr or Ca. One that is highly soluble in water (for example, an acetate or nitrite in the case of Ba) is especially desirable.

Examples of the precursor for depositing the catalyst metal include water-soluble complexes and salts of Pd, Rh or Pt for example.

The S-containing water-soluble organic compound is not particularly limited as long as it can form a sulfate of the alkaline earth metal in the process of preparing, drying and firing the raw material suspension. Desirable examples include taurine (2-aminoethanesulfonic acid), aminobenzenesulfonic acid, aminomethanesulfonic acid, 1-amino-2-naphthol-4-sulfonic acid, cysteic acid, methionine, cysteine, dimethyl sulfate, dimethyl sulfide, dimethyl trisulfide, 2-mercaptoethanol, diphenyl sulfide, dithiothreitol, allyl disulfide, sulfolane, furfuryl mercaptan, dipropyl disulfide, dimethyl sulfone, dimethyl sulfoxide and the like.

Of these, a water-soluble organic compound having at least one functional group selected from a sulfo group ($-SO_3H$), a sulfonyl group ($-S(=O)_2-$), and a sulfinyl group ($-S(=O)-$) in the molecule is desirably used because it has good reactivity for producing sulfates.

Furthermore, one having a basic group such as an amino group ($-NH_2$) is desirable because it is highly effective for preventing a drop in the pH (that is, acidification) of the raw material suspension.

A raw material suspension in slurry form can then be prepared by adding the various raw materials described above (carrier-forming material, catalyst metal material, water-soluble compound of alkaline earth metal, S-containing water-soluble organic compound) to an aqueous solvent (typically water, such as pure water or deionized water), and stirring well with a stirrer. For example, an inorganic compound particle (powder) for constituting the porous carrier can be first mixed and stirred with water, after which a precursor of the catalyst metal is added, and a water-soluble compound of an alkaline earth metal is further added and stirred for a specific time (for example, 10 to 60 minutes), after which an S-containing water-soluble organic compound is added, and the mixture is sufficiently dried (for at least 6 hours, or preferably at least 8 hours, for example) at a temperature range of about 90° C. to 130° C., and then fired for a few hours (for example, about 1 to 3 hours) at a temperature range of about 400° C. to 600° C.

By such a process, a powder material including the catalyst metal and alkaline earth metal sulfate supported (fixed) in a highly dispersed state on the outer surface and inside (in the pores) of the porous carrier particles (secondary particles) can be prepared in the preliminary stage of forming the catalyst layer (including the alkaline earth metal-supporting region). The resulting powder material can be subjected to pulverization as necessary to adjust it to the desired particle size (for example, a particle diameter of not more than 10 μm).

With this process, the alkaline earth metal sulfate supported on the outer surface and within the pores of the porous carrier particles can be given a much smaller particle diameter than the conventional one.

Typically, with the technique disclosed here, fine particles of an alkaline earth metal sulfate (typically barium sulfate) having an average particle diameter as measured by an X-ray diffraction method of not more than 25 nm (for example, 10 nm to 25 nm), or preferably not more than 20 nm, can be supported in a highly dispersed state on the outer surface and within the pores of a porous carrier particle.

With the process described above, moreover, it is possible to achieve a highly dispersed state, in which the correlation coefficient $R_{Ae/M}$ described above is at least 0.5, or preferably at least 0.6, or more preferably at least 0.7.

Next, a slurry for forming the catalyst layer (alkaline earth metal-supporting region) is prepared using the resulting powder material (after suitable pulverization processing). The slurry may be prepared as when forming the catalyst layer of a conventional exhaust gas purification catalyst, with no particular limitations.

For example, when forming the lower layer 6B as an alkaline earth metal-supporting region on the substrate 1 of the exhaust gas purification catalyst 10 of the bilayer type shown in FIG. 2 in which the upper layer and the lower layer of the catalyst layer 6 are configured differently from one another, an alkaline earth metal-supporting region forming slurry containing the powder material prepared above together with a carrier powder not supporting the alkaline earth metal as necessary (for example, an OSC material such as alumina, zirconia or CZ composite oxide) is coated on the honeycomb substrate 1 by a known wash coating method or the like.

Next, an upper layer forming slurry containing a desired catalyst metal component (typically, a solution containing PGM ions different from the PGM used in forming the alkaline earth metal-supporting region (lower layer) 6B) and a desired carrier powder (OSC material composed of alumina, zirconia, or CZ composite oxide, or the like) is laminate coated on the surface of the lower layer 6B by wash coating or the like.

This is then dried and fired for a specific time at a specific temperature to form a catalyst layer 6 with a laminate structure having an alkaline earth metal-supporting region (lower layer) 6B and an upper layer 6A on a substrate 1.

Alternatively, instead of this one-time firing process, a slurry for forming the alkaline earth metal-supporting region (lower layer) can be coated on the surface of the substrate, and dried and fired to first form the alkaline earth metal-supporting region (lower layer), after which a slurry for forming the upper layer can be coated on the surface of the lower layer, and dried and fired to form the upper layer of the catalyst layer in a two-stage firing process.

The firing conditions for firing the wash-coated slurry are not particularly limited because they vary depending on the shape and size of the substrate or carrier, but typically a targeted catalyst layer with the target alkaline earth metal-supporting region and other regions can be formed by firing for about 1 to 5 hours at 400° C. to 1,000° C. The drying conditions before firing are also not particularly limited, but preferably drying is performed for about 1 to 12 hours at 80° C. to 300° C.

When the catalyst layer 6 is formed by wash coating, moreover, a binder is preferably included in the slurry in order to closely attach the slurry to the surface of the substrate 1, or on the surface of the lower layer 6B in the case of a catalyst layer with a laminated structure in a suitable manner. An alumina sol, silica sol or the like for example can preferably be used as the binder for this purpose. The viscosity of the slurry may also be adjusted appropriately so that the slurry can easily flow into the cells 2 of the substrate (for example, a honeycomb substrate) 1.

Some examples of the present invention are explained below, but not with the intent of limiting the invention to what is shown in the examples.

Test Example 1: Preparation of Exhaust Gas Purification Catalyst

In this test example, an exhaust gas purification catalyst provided with a catalyst layer having a bilayer structure such as that shown in FIG. 2 was prepared as follows using a cylindrical honeycomb substrate (cordierite honeycomb substrate with catalyst volume of 0.875 L) of 103 mm in diameter and a total of 105 mm long as shown in FIG. 1.

First, a slurry for forming the lower layer (alkaline earth metal-supporting region) of the catalyst layer was prepared as follows using either (1) barium hydroxide, (2) barium acetate, (3) barium nitrate or (4) strontium hydroxide as the water-soluble compound of the alkaline earth metal, and either (1) taurine, (2) dimethyl sulfone, (3) sulfolane, (4) cysteic acid, (5) dimethyl sulfoxide, (6) aminobenzenesulfonic acid or (7) aminomethanesulfonic acid as the S-containing water-soluble organic compound as shown in the corresponding columns of Table 1.

That is, 600 g of alumina or 600 g of zirconia were added to 2 L of pure water, and stirred for 30 minutes to prepare a liquid containing all the components suspended uniformly. Then, 535 g of an aqueous palladium nitrate solution with a Pd concentration of 2 wt % was added to the suspension, and 107 g of either any of the water-soluble Ba compounds of (1) to (3) above or the water-soluble Sr compound of (4) above was added. This was then stirred for 30 minutes with a stirrer. Thereafter, 63 g of any of the S-containing water-soluble organic compounds of (1) to (7) above was added, and stirred to prepare total 23 types of raw material suspensions in slurry form with combinations of the raw materials corresponding to Examples 1 to 23 in Table 1, respectively. All the raw material suspensions had pH values of at least 5.

Each raw material suspension was then dried for at least 8 hours at 110° C., and then fired for 2 hours at 500° C. This was then pulverized appropriately until the particle diameter was not more than 10 μm to prepare powder materials corresponding to each raw material suspension (Examples 1 to 23 in Table 1).

The following were also prepared at the same time as comparative examples:

a powder material prepared by employing the same process but using no S-containing water-soluble organic compound and using a barium sulfate particle from the beginning in place of the water-soluble compound of the alkaline earth metal (Comparative Example 1);

a powder material prepared by employing the same process using barium acetate as a water-soluble Ba compound but using aluminum sulfate in place of the S-containing water-soluble organic compound (Comparative Example 2);

a powder material prepared by employing the same process using barium acetate as a water-soluble Ba compound but using sulfuric acid in place of the S-containing water-soluble organic compound (Comparative Example 3);

a powder material prepared by employing the same process using barium hydroxide as a water-soluble Ba compound but using sulfuric acid in place of the S-containing water-soluble organic compound (Comparative Example 4); and a powder material prepared by employing the same process using barium acetate as a water-soluble Ba compound but using no raw material corresponding to an S-containing water-soluble organic compound (Comparative Example 5).

For each powder material (Examples 1 to 23 and Comparative Examples 1 to 5 in Table 1), 860 g of alumina powder, 970 g of CZ composite oxide powder with a molar ratio (Ce:Zr, etc.) of Ce to Zr (including La, Y and other rare earth elements included in trace amounts) of 3:7, and 30 g of alumina binder were added to 2.4 L of pure water, and wet pulverized to a particle diameter of not more than 5 μm with a magnetic ball mill to prepare a total 28 lower layer forming slurries (that is, 28 types corresponding to Examples 1 to 23 and Comparative Example 1 to 5 in Table 1).

Meanwhile, the slurry for forming the upper layer of the catalyst layer was prepared as follows. That is, 104 g of aqueous rhodium nitrate solution with an Rh concentration of 2 wt %, 400 g of alumina powder, and 1240 g of the CZ composite oxide powder described above were added to 5 L of pure water, and wet pulverized to a particle diameter of not more than 5 μm with a magnetic ball mill to prepare an upper layer forming slurry of this test example.

A substrate was then first wash coated with the lower layer forming slurry, and dried for about 1 hour at 150° C. to form a lower layer (unfired coat layer) on the surface of the substrate (rib wall surfaces within cells). The substrate was then wash coated with the upper layer forming slurry, and dried for about 1 hour at 150° C. to laminate an upper layer (unfired coat layer) on the surface of the lower layer. This was then fired for 1 hour at 500° C. to obtain an exhaust gas purification catalyst with a formed catalyst layer having a bilayer structure composed of an upper and lower layer (coating amount 210 g/L for a total of upper and lower layers).

That is, by using different slurries for forming the lower layer, a total of 28 type of exhaust gas purification catalysts (Examples 1 to 23 and Comparative Examples 1 to 5) were prepared each having a different composition of the lower layer of the catalyst layer.

Test Example 2: Confirmation of Dispersibility of Barium Sulfate by FE-EPMA

Each of the powder materials prepared in Test Example 1 was subjected to area analysis using a unit (JXA-8530F) manufactured by JEOL Ltd. in accordance with the manual.

That is, a specific amount of each powder material was embedded in epoxy resin. Once the resin had been cured, the surface to be analyzed was polished, and a commercial carbon coater (VC-100W: product of Vacuum Device Co) was used to deposit carbon as a conductive material on the polished surface. A region corresponding to the lower layer of the catalyst layer was then designated appropriately on the carbon deposited surface, and this region was subjected to area analysis by FE-EPMA. The measurement conditions were:

Pixel size: 0.34 μm×0.34 μm
Number of pixels measured: 256×256
Acceleration voltage: 20 kV
Irradiation current: 100 nA
Probe diameter: Set to minimum in measurement conditions
Unit measurement time: 50 ms/1 pixel
Measurement magnification: ×1,000.

The characteristic X-ray intensity ($\alpha$:cps) of the Ba element (Sr element in Example 24) and the characteristic X-ray intensity ($\beta$:cps) of the main constituent element of the inorganic compound constituting the porous carrier (Al or Zr in FIG. 3) were then measured for each pixel. In this test example, the characteristic X-ray intensity (γ:cps) of the S element was also measured for each pixel.

In this area analysis, the X-ray intensity threshold per pixel (section) was set at 15 cps, and pixels exhibiting intensities equal to or less than the threshold were excluded from the data for calculating the correlation coefficient.

After this area analysis, the resulting data were used to determine the correlation coefficient $R_{Ba/Al}$ or $R_{Ba/Zr}$ ($R_{Sr/Zr}$ in Example 24 only) using the CORREL coefficient function of "Excel" spreadsheet software.

At the same time, $R_{Ba/S}$ ($R_{Sr/S}$ in Example 24 only) was determined using the characteristic X-ray intensity (γ:cps) of the S element as the third variable for each pixel in this test example. The results are shown in the corresponding column of Table. 1.

Moreover, data (images) of the element mappings of Ba and S are shown in FIGS. 3 to 8 for a sample of Example 14 and samples of Comparative Examples 1 and 2.

catalysts of Comparative Examples 1 and 2, on the other hand, the Ba element and S element are concentrated either on the outer surface along the outline of the porous carrier (secondary particles) or in the portions slightly remote from the carrier particles (FIGS. 5 to 8).

This is also clear from the values given in Table 1 for the correlation coefficients $R_{Ba/Al}$ or $R_{Ba/Zr}$ ($R_{Sr/Zr}$ in Example 24 only) of the exhaust gas purification catalysts of Examples and Comparative Examples.

That is, the correlation coefficients $R_{Ba/Al}$ or $R_{Ba/Zr}$ ($R_{Sr/Zr}$ in Example 24 only) in Examples indicate a high correlation of at least 0.5, or preferably at least 0.6, or more preferably at least 0.7. On the other hand, apart from Comparative Examples 5 containing no Ba sulfate, the correlation coefficients $R_{Ba/Al}$ of Comparative Examples in which the Ba sulfates are not highly dispersed are extremely low correlation coefficients of 0.1 to 0.33.

TABLE 1

| | Materials used | | | Correlation coefficient | | Ba sulfate | |
| --- | --- | --- | --- | --- | --- | --- | --- |
| | Ba source | S source | Main carrier component | Ba/main raw material | Ba/S | particle diameter (nm) | Performance Rich $NO_x$ |
| Example 1 | Ba hydroxide | Taurine | Al | 0.61 | 0.70 | 18 | 72 |
| Example 2 | Ba acetate | Taurine | Al | 0.73 | 0.72 | 15 | 79 |
| Example 3 | Ba nitrate | Taurine | Al | 0.57 | 0.65 | 20 | 73 |
| Example 4 | Ba acetate | Dimethyl sulfone | Al | 0.70 | 0.65 | 15 | 74 |
| Example 5 | Ba nitrate | Sulfolane | Al | 0.51 | 0.55 | 21 | 68 |
| Example 6 | Ba acetate | Cysteic acid | Al | 0.74 | 0.65 | 15 | 76 |
| Example 7 | Ba hydroxide | Dimethyl sulfoxide | Al | 0.61 | 0.64 | 18 | 72 |
| Example 8 | Ba acetate | Aminobenzenesulfonic acid | Al | 0.71 | 0.67 | 15 | 77 |
| Example 9 | Ba hydroxide | Aminomethanesulfonic acid | Al | 0.56 | 0.68 | 18 | 72 |
| Example 10 | Ba acetate | Dimethyl sulfoxide | Al | 0.70 | 0.61 | 15 | 74 |
| Example 11 | Ba acetate | Dimethyl sulfone | Al | 0.70 | 0.65 | 15 | 74 |
| Example 12 | Ba hydroxide | Cysteic acid | Al | 0.56 | 0.68 | 18 | 71 |
| Example 13 | Ba hydroxide | Taurine | Zr | 0.61 | 0.68 | 18 | 72 |
| Example 14 | Ba acetate | Taurine | Zr | 0.73 | 0.81 | 15 | 81 |
| Example 15 | Ba nitrate | Taurine | Zr | 0.58 | 0.68 | 22 | 72 |
| Example 16 | Ba acetate | Dimethyl sulfone | Zr | 0.72 | 0.63 | 15 | 75 |
| Example 17 | Ba nitrate | Sulfolane | Zr | 0.51 | 0.55 | 21 | 69 |
| Example 18 | Ba acetate | Cysteic acid | Zr | 0.73 | 0.68 | 15 | 79 |
| Example 19 | Ba hydroxide | Dimethyl sulfoxide | Zr | 0.61 | 0.62 | 18 | 70 |
| Example 20 | Ba acetate | Aminobenzenesulfonic acid | Zr | 0.72 | 0.68 | 15 | 77 |
| Example 21 | Ba hydroxide | Aminomethanesulfonic acid | Zr | 0.56 | 0.65 | 18 | 72 |
| Example 22 | Ba acetate | Dimethyl sulfoxide | Zr | 0.72 | 0.63 | 15 | 76 |
| Example 23 | Ba hydroxide | Dimethyl sulfone | Zr | 0.65 | 0.64 | 18 | 74 |
| Example 24 | Sr hydroxide | Taurine | Zr | 0.61 | 0.69 | 19 | — |
| Comparative Example 1 | Ba sulfate | — | Al | 0.12 | 0.90 | 55 | 66 |
| Comparative Example 2 | Ba acetate | Ammonium sulfate | Al | 0.33 | 0.38 | 32 | 65 |
| Comparative Example 3 | Ba acetate | Sulfuric acid | Al | 0.10 | 0.75 | 33 | 66 |
| Comparative Example 4 | Ba hydroxide | Sulfuric acid | Al | 0.10 | 0.65 | 34 | 63 |
| Comparative Example 5 | Ba acetate | — | Al | 0.73 | 0 | N.D. | 62 |

Figure 3:
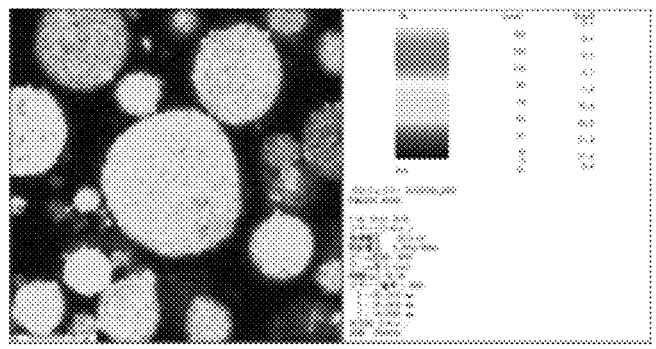
FIG. 3 shows the results of Ba element mapping in FE-EPMA area analysis (256×256 pixels) of the catalyst layer (alkaline earth metal-supporting region) of the exhaust gas purification catalyst of Example 14.
Figure 4:
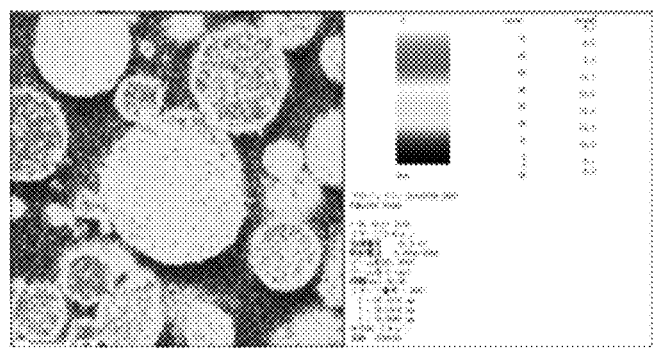
FIG. 4 shows the results of S element mapping in FE-EPMA area analysis (256×256 pixels) of the catalyst layer (alkaline earth metal-supporting region) of the exhaust gas purification catalyst of Example 14.
Figure 5:
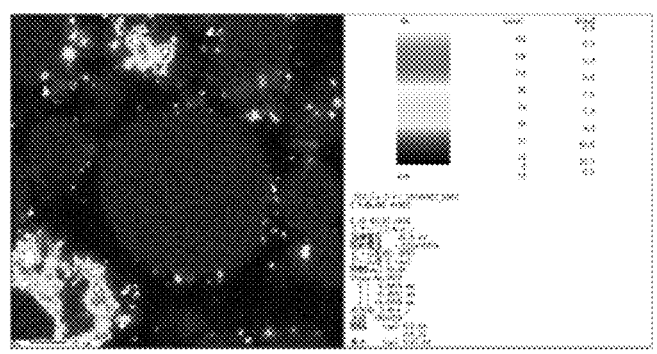
FIG. 5 shows the results of Ba element mapping in FE-EPMA area analysis (256×256 pixels) of the catalyst layer (alkaline earth metal-supporting region) of the exhaust gas purification catalyst of Comparative Example 1.
Figure 6:
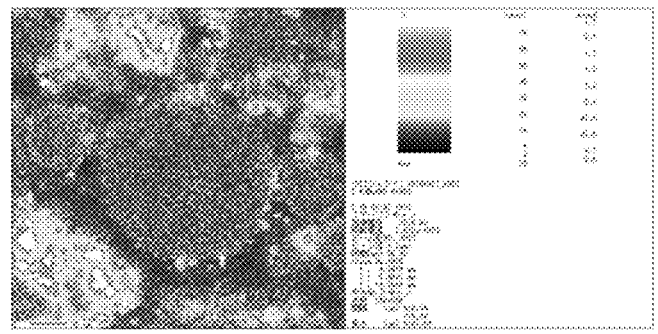
FIG. 6 shows the results of S element mapping in FE-EPMA area analysis (256×256 pixels) of the catalyst layer (alkaline earth metal-supporting region) of the exhaust gas purification catalyst of Comparative Example 1.
Figure 7:
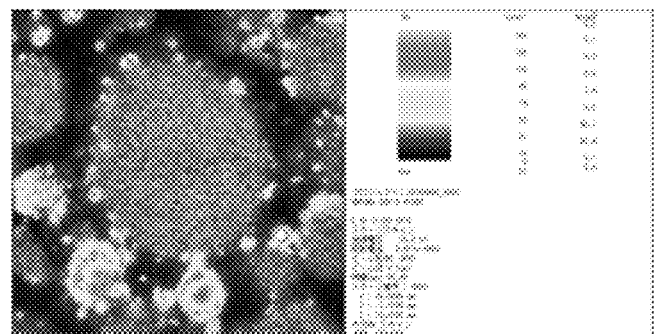
FIG. 7 shows the results of Ba element mapping in FE-EPMA area analysis (256×256 pixels) of the catalyst layer (alkaline earth metal-supporting region) of the exhaust gas purification catalyst of Comparative Example 2.
Figure 8:
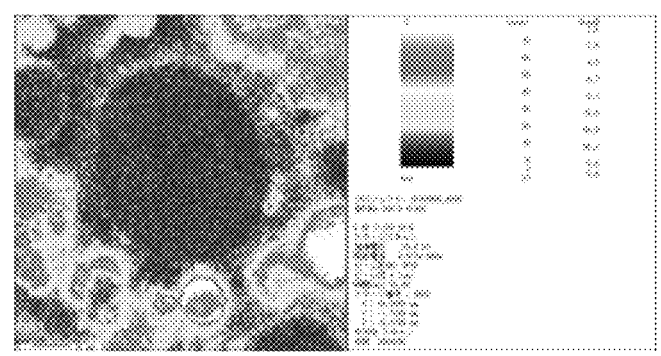
FIG. 8 shows the results of S element mapping in FE-EPMA area analysis (256×256 pixels) of the catalyst layer (alkaline earth metal-supporting region) of the exhaust gas purification catalyst of Comparative Example 2.

As shown by the element mapping in the drawings, in the exhaust gas purification catalyst of Example 14, the Ba element and S element are present in a highly dispersed state throughout the porous carrier (secondary particles) shown in the image (FIGS. 3 and 4). In the exhaust gas purification These results clearly show that by forming a catalyst layer (alkaline earth metal-supporting region) by the process disclosed here, it is possible to support an alkaline earth metal sulfate such as $BaSO_4$ or $SrSO_4$ in a highly dispersed state throughout the outer surface and the inside (inside the pores) of a porous carrier. Consequently, regardless of where the catalyst metal particle is supported on the porous carrier, the alkaline earth metal is located near the catalyst metal particle, and can therefore more effectively function as a co-catalyst component.

Test Example 3: Measurement of Average Particle Diameter of Alkaline Earth Metal Sulfate Supported on Porous Carrier Using a commercial X-ray diffractometer (RINT-2500: product of Rigaku Corporation), the average particle diameters of the barium sulfates (strontium sulfate in Example 24) contained in the exhaust gas purification catalysts of Examples and Comparative Examples were measured by an X-ray diffraction method. That is, they were calculated with analysis software (PDXL: product of Rigaku Corporation) from the characteristic peak of each sulfate (for example, around 22° to 25° in the case of barium sulfate). The results are shown in the corresponding column of Table 1.

As shown in the table, in all of Examples, the barium sulfates had fine particle sizes, with an average particle diameter of not more than 25 nm in all cases. In the especially preferred examples, the average particle diameter was not more than 20 nm (minimum 15 nm). In Comparative Examples, on the other hand, such a fine size could not be achieved, and the particle diameters were at least 30 nm in all cases.

Test Example 4: Evaluation of $NO_x$ Purification Performance

The exhaust gas purification catalysts of Examples and Comparative Examples apart from Example 24 were subjected to endurance testing, and $NO_x$ purification performance was then evaluated.

That is, first the exhaust gas purification catalysts of Examples and Comparative Examples were installed in the exhaust system of a 2.5 L engine, the engine was started, and the catalyst bed temperature was maintained at 1,000° C. for 46 hours.

Following this endurance test, each exhaust gas purification catalyst was transferred to the exhaust system of another 2.5 L engine for evaluation. The air-fuel ratio A/F of the mixed gas supplied to the 2.5 L engine for evaluation was then switched from a lean state of 15.1 to a rich state of 14.1, and the 3-minute average $NO_x$ emission was measured. The rich gas $NO_x$ purification rate (%) was calculated as ($NO_x$ emission from engine–$NO_x$ emission from catalyst)/($NO_x$ emission from engine). The results are shown in the corresponding column of Table 1.

As shown by the values for $NO_x$ purification rate (%) in Table 1, the $NO_x$ purification rates of all the exhaust gas purification catalysts of all of Examples tested were above the $NO_x$ purification rates of the exhaust gas purification catalysts of all of Comparative Examples. This shows that the performance (here $NO_x$ purification performance) of barium sulfate as a co-catalyst is improved by allowing fine barium sulfate to be present in the catalyst layer (alkaline earth metal-supporting region) in a highly dispersed state.

Test Example 5: Evaluation of Exhaust Gas Purification Performance (Temperature Characteristics)

Figure 9:
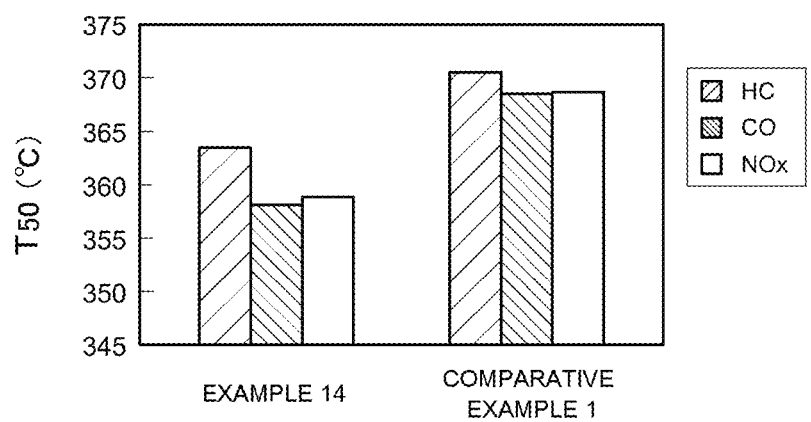
FIG. 9 is a graph comparing the HC, CO and $NO_x$ purification performance (T50: ° C.) of an exhaust gas purification catalyst of one example with the performance of a comparative example.

Using the exhaust gas purification catalyst of Example 14 and the exhaust gas purification catalyst of Comparative Example 1, the temperature characteristics (T50: ° C.) were investigated as one measure of the degree of exhaust gas purification performance Specifically, each exhaust gas purification catalyst was subjected to endurance testing for 46 hours at 1,000° C. in an engine bench test, after which the inlet gas temperature of the catalyst was raised from 200° C. to 450° C. at a rate of 50° C./minute using a heat exchanger as model exhaust gas was supplied (Ga=23 g/s, 2,600 rpm) and the HC (propylene here) concentration, CO concentration and $NO_x$ concentration were measured at the outlet of the catalyst. The temperature at which the outlet gas concentration reached 50 mol % with respect to the inlet gas concentration (50% purification rate temperature ° C.; T50) was evaluated. The results are shown in FIG. 9. The lower the T50, the greater the purification performance.

As shown in FIG. 9, the T50 of the exhaust gas purification catalyst of Example 14 was lower than the T50 of the exhaust gas purification catalyst of Comparative Example 1 for all of HC, CO and $NO_x$.

This shows that an exhaust gas purification catalyst provided by the manufacturing method disclosed here and characterized in that fine barium sulfate is supported in a highly dispersed state throughout a porous carrier exhibits better purification performance than an exhaust gas purification catalyst provided with barium sulfate prepared by a conventional method.

Specific examples of the invention were explained above, but these are only examples, and do not limit the claims. The technology described in the claims encompasses various changes and modifications to these specific examples.

The invention claimed is:
1. An exhaust gas purification catalyst to be disposed in the exhaust pipe of an internal combustion engine for purifying exhaust gas emitted by the internal combustion engine, the exhaust gas purification catalyst comprising:
a substrate and
a catalyst layer formed on the substrate,
wherein the catalyst layer has an alkaline-earth metal-supporting region including
a porous carrier composed of an inorganic compound,
at least one catalyst metal belonging to the platinum group, which is supported on the porous carrier and functions as an oxidation and/or reduction catalyst, and
at least one sulfate of alkaline-earth metal supported on the porous carrier,
and wherein when a cross-section of the alkaline-earth metal-supporting region of the catalyst layer is subjected to area analysis by FE-EPMA under conditions of pixel (section) size of 0.34 μm×0.34 μm and number of measured pixels (sections) of 256×256, and a characteristic X-ray intensity (α:cps) of the alkaline-earth metal element (Ae) and a characteristic X-ray intensity (β:cps) of the main constituent element (M) of the inorganic compound constituting the porous carrier are measured for each pixel, and when the Pearson correlation coefficient calculated using the resulting α and β in each pixel is designated as $R_{Ae/M}$, the value of $R_{Ae/M}$ is at least 0.7, and
wherein the porous carrier constituted of an inorganic compound is a secondary particle, and the at least one sulfate of alkaline-earth metal is carried on an outer surface of the porous carrier and in the inside of the secondary particle in a highly dispersed state.
2. The exhaust gas purification catalyst according to claim 1, wherein the average particle diameter of the alkaline-earth metal sulfate supported on the porous carrier as measured by an X-ray diffraction method is not more than 25 nm.

3. The exhaust gas purification catalyst according to claim 1, wherein the exhaust gas purification catalyst has at least palladium (Pd) and/or rhodium (Rh) as the catalyst metal and has at least barium sulfate ($BaSO_4$) as the alkaline-earth metal sulfate.

* * * * *